(12) United States Patent
Wang et al.

(10) Patent No.: US 12,395,685 B2
(45) Date of Patent: Aug. 19, 2025

(54) HIGHLY EFFICIENT MODEL FOR VIDEO QUALITY ASSESSMENT

(71) Applicant: Google LLC, Mountain View, CA (US)

(72) Inventors: Yilin Wang, Sunnyvale, CA (US); Miao Yin, Somerset, NJ (US); Qifei Wang, Sunnyvale, CA (US); Boqing Gong, Bellevue, WA (US); Neil Aylon Charles Birkbeck, Cruz, CA (US); Balineedu Chowdary Adsumilli, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 83 days.

(21) Appl. No.: 18/336,577

(22) Filed: Jun. 16, 2023

(65) Prior Publication Data
US 2024/0422369 A1   Dec. 19, 2024

(51) Int. Cl.
| | | |
|---|---|---|
| *H04N 21/2343* | (2011.01) | |
| *G06T 7/00* | (2017.01) | |
| *H04N 19/132* | (2014.01) | |
| *H04N 21/235* | (2011.01) | |
| *H04N 21/2543* | (2011.01) | |
| *H04N 21/435* | (2011.01) | |
| *H04N 21/4402* | (2011.01) | |
| *H04N 21/466* | (2011.01) | |
| *H04N 21/485* | (2011.01) | |

(52) U.S. Cl.
CPC ... *H04N 21/234363* (2013.01); *G06T 7/0002* (2013.01); *H04N 19/132* (2014.11); *H04N 21/234381* (2013.01); *H04N 21/4666* (2013.01); *H04N 21/4858* (2013.01)

(58) Field of Classification Search
None
See application file for complete search history.

(56) References Cited

U.S. PATENT DOCUMENTS

| | | | |
|---|---|---|---|
| 2010/0061447 A1* | 3/2010 | Tu | H04N 21/2383 375/240.03 |
| 2013/0031589 A1* | 1/2013 | Casanova | H04N 21/6587 725/91 |
| 2024/0171788 A1* | 5/2024 | Kreis | H04N 21/234363 |

OTHER PUBLICATIONS

Abu-El-Haija, et al., "YouTube-8M: A Large-Scale Video Classification Benchmark," arXiv:1609.08675v1 [cs.CV] Sep. 27, 2016, 10 pages.

(Continued)

*Primary Examiner* — Brian T Pendleton
*Assistant Examiner* — Jean D Saint Cyr
(74) *Attorney, Agent, or Firm* — Lowenstein Sandler LLP

(57) ABSTRACT

A method for generating, for a video stream of a first spatial resolution and a first temporal resolution, a first reduced quality steam of a second spatial resolution and a second reduced-quality stream of a second temporal resolution. A first subset of STPs is sampled from the first reduced-quality stream and a second subset of STPs is sampled from the second reduced-quality stream. Using a machine learning model (MLM) the STPs are processed to identify a quality score for each quality-representative STPs that are representative of a quality of the video stream. One or more quality-improving actions for the video stream are identified using the quality scores of the quality-representative STPs.

20 Claims, 7 Drawing Sheets

(56) References Cited

OTHER PUBLICATIONS

Internet Archive. Moving image archive. https://archive.org/details/movies, accessed Jun. 9, 2023, 5 pages.
Arnab, et al., "ViViT: A Video Vision Transformer," Proceedings of the International Conference on Computer Vision (ICCV), 2021, 14 pages. arXiv:2103.15691v2 [cs.CV] Nov. 1, 2021.
Bampis, et al., "Study of Temporal Effects on Subjective Video Quality of Experience," IEEE Transactions on Image Processing, vol. 26, No. 11, Nov. 2017, 5217-5231.
Chen et al., "Chasing Sparsity in Vision Transformers: An End-to-End Exploration," 35th Conference on Neural Information Processing Systems (NeurIPS 2021), 15 pages.
Dosovitskiy et al., "An Image is Worth 16×16 Words: Transformers for Image Recognition at Scale," Published as a conference paper at ICLR 2021, 22 pages. arXiv:2010.11929v2 [cs.CV] Jun. 3, 2021.
Vaswani et al., "Attention Is All You Need," 31st Conference on Neural Information Processing Systems (NIPS 2017), Long Beach, CA, USA, 11 pages.
Thomee, et al., "YFCC100M: The New Data in Multimedia Research," Communications of the ACM 0001-0782/2016/2, 8 pages. arXiv:1503.01817v2 [cs.MM] Apr. 25, 2016. http://dx.doi.org/10.1145/2812802.
Götz-Hahn, et al., "KonVid-150k: A Dataset for No-Reference Video Quality Assessment of Videos in-the-Wild," IEEE Access, vol. 9, May 2021, 23 pages. DOI: 10.1109/ACCESS.2021.3077642.
He, et al. "Deep Residual Learning for Image Recognition," Proceedings of the IEEE conference on computer vision and pattern recognition, 2016, 770-778.
Ghadiyaram et al., "A Subjective and Objective Study of Stalling Events in Mobile Streaming Videos," Nov. 2017, IEEE Transactions on Circuits and Systems for Video Technology PP(99):1-1. DOI:10.1109/TCSVT.2017.2768542.
Gumbel, Emil J., "Statistical theory of extreme values and some practical applications: a series of lectures," vol. 33, US Government Printing Office, 1954, 60 pages.
Hosu, et al., "TheKonstanzNaturalVideoDatabase(KoNViD-1k)," Erschienen in: 2017 Ninth International Conference on Quality of Multimedia Experience (QoMEX), Piscataway, NJ, IEEE, 2017, 6 pages. ISBN 978-1-5386-4024-1. https://dx.doi.org/10.1109/QoMEX.2017.7965673.
Jang, et al., "Categorical Reparameterization With Gumbel-Softmax," Published as a conference paper at ICLR 2017, 13 Pages. arXiv:1611.01144v5 [stat.ML] Aug. 5, 2017.
Korhonen, Jari, "Two-Level Approach for No-Reference Consumer Video Quality Assessment," IEEE Transactions on Image Processing, 28(12), (2019), 5923-5938. doi: 10.1109/TIP.2019.2923051.
Li, et al., "Quality assessment of in-the-wild videos," In Proceedings of the 27th ACM International Conference on Multimedia (MM '19), Oct. 21-25, 2019, Nice, France, ACM, New York, NY, USA, 9 pages. https://doi.org/10.1145/3343031.3351028.
Liu, et al., "Swin Transformer: Hierarchical Vision Transformer using Shifted Windows," Proceedings of the International Conference on Computer Vision (ICCV), 2021, 14 pages. arXiv:2103.14030v2 [cs.CV] Aug. 17, 2021.
Ridnik, et al., "ImageNet-21K Pretraining for the Masses," arXiv:2104.10972v4 [cs.CV] Aug. 5, 2021, 20 pages.
Seshadrinathan, et al., "Study of subjective and objective quality assessment of video," IEEE Transactions on Image Processing, vol. 19 Issue 6, Jun. 2010, pp. 1427-1441. https://doi.org/10.1109/TIP.2010.2042111.
Sinno and Bovik, "Large-Scale Study of Perceptual Video Quality," 2018 25th IEEE International Conference on Image Processing (ICIP), pp. 276-280, Oct. 2018. arXiv:1803.01761v2 [eess.IV] Nov. 4, 2018.
Tu, et al., "UGC-VQA: Benchmarking Blind Video Quality Assessment for User Generated Content," IEEE Transactions on Image Processing, 2021, 16 pages. arXiv:2005.14354v2 [cs.CV] Apr. 17, 2021.
Tu, et al., "RAPIQUE: Rapid and Accurate Video Quality Prediction of User Generated Content," IEEE Open Journal of Signal Processing, vol. 2, 2021, 425-440. arxiv.org/abs/2101.10955.
Wang et al., "Linformer: Self-Attention with Linear Complexity," arXiv:2006.04768v3 [cs.LG] Jun. 14, 2020, 12 pages. https://doi.org/10.48550/arXiv.2006.04768.
Wang, et al., "YouTube UGC Dataset for Video Compression Research," 2019 IEEE 21st International Workshop on Multimedia Signal Processing (MMSP), 5 pages. arXiv:1904.06457v2 [cs.MM] Aug. 1, 2019.
Wang, et al., "Rich features for perceptual quality assessment of UGC videos," Proceedings of the IEEE/CVF Conference on Computer Vision and Pattern Recognition (CVPR), 2021, pp. 13435-13444.
Wang, et al., "Revisiting the efficiency of UGC video quality assessment," 2022 IEEE International Conference on Image Processing (ICIP), Bordeaux, France, 2022, pp. 3016-3020. doi: 10.1109/ICIP46576.2022.9897401.
Wu, et al., "FAST-VQA: Efficient End-to-end Video Quality Assessment with Fragment Sampling," Proceedings of European Conference of Computer Vision (ECCV), 2022, 17 pages. arXiv:2207.02595v1 [cs.CV] Jul. 6, 2022.
Ying, et al., "Patch-VQ: 'Patching Up' the Video Quality Problem," Proceedings of the IEEE/CVF Conference on Computer Vision and Pattern Recognition (CVPR), 2021, pp. 14019-14029.
Ying, et al., "Patch-VQ: 'Patching Up' the Video Quality Problem," In Proceedings of the IEEE/CVF Conference on Computer Vision and Pattern Recognition, pp. 14019-14029, 2021. arXiv:2011.13544v2 [cs.CV] Feb. 25, 2022.

* cited by examiner

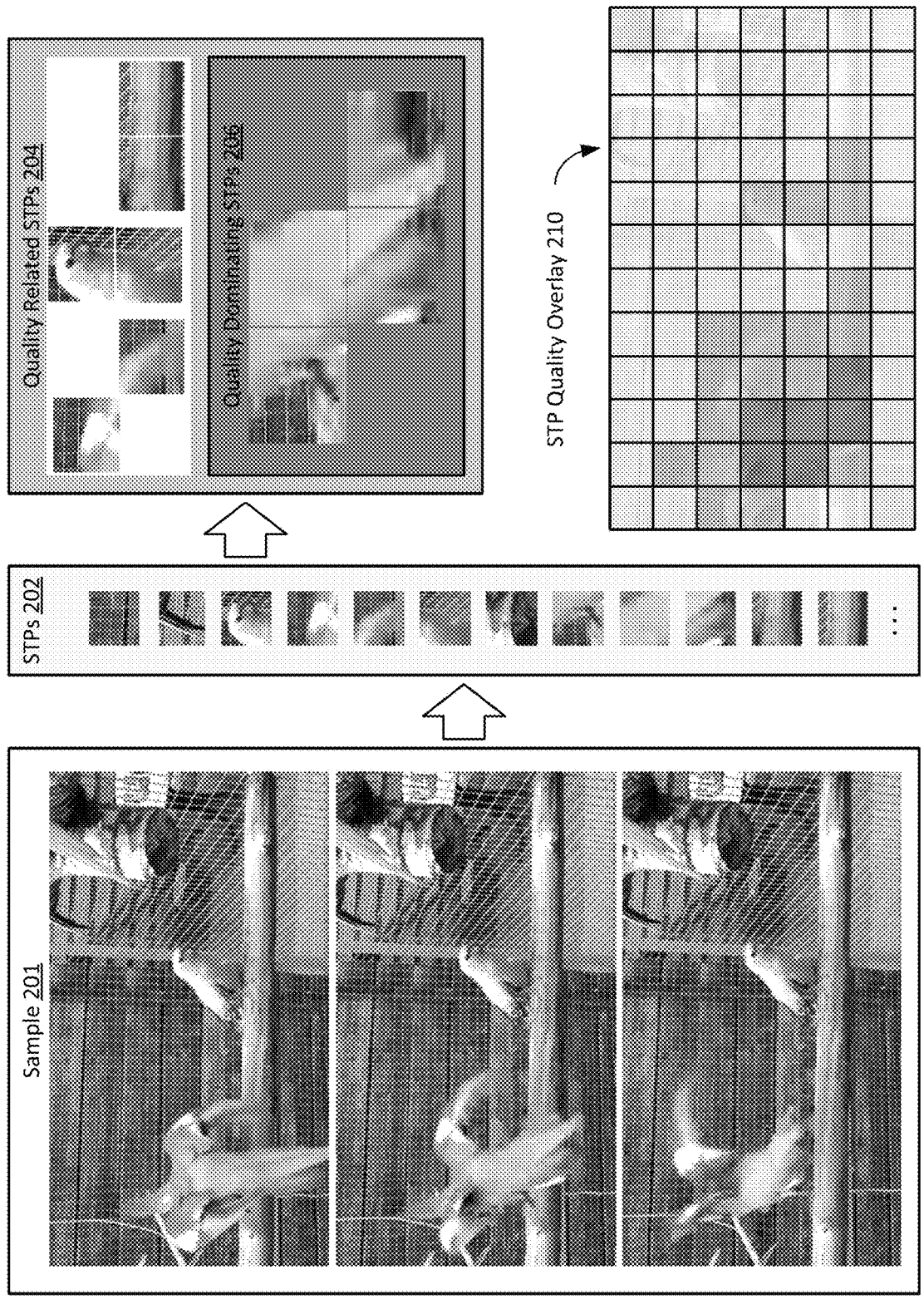

HIGHLY EFFICIENT MODEL FOR VIDEO QUALITY ASSESSMENT

TECHNICAL FIELD

Aspects and implementations of the present disclosure relate to a highly efficient model for video quality assessment.

BACKGROUND

A platform (e.g., a video stream platform, etc.) can provide users with video stream. Video stream can include images and videos, and can be interactive. Assessing the perceptual quality of video stream to be provided to users can improve the user's experience with the platform, but can be computationally complex and expensive. Video quality assessment (VQA) is a field of research which aims to study and predict user opinions on video perceptual quality. Improvements to VQA can benefit video compression, enhancement, streaming, search, and user recommendations. With the ever-increasing amount of user generated content (UGC) on video stream platforms (e.g., social media platforms), performing VQA on UGC becomes more critical. The computational complexity of VQA models can grow exponentially with the video stream resolution, and can cause high deployment costs.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

An aspect of the disclosure provides a computer-implemented method that includes generating, for a video stream of a first spatial resolution and a first temporal resolution, a first reduced-quality stream of a second spatial resolution and a second reduced-quality stream of a second temporal resolution, sampling multiple spatio-temporal patches (STPs) from the video steam, where a first subset of STPs is sampled from the first reduced-quality stream and a second subset of STPs is sampled from the second reduced-quality stream, processing, using a machine learning model (MLM), the STPs to identify a quality score for each quality-representative STP which is representative of a quality of the video stream, and identifying, using the quality scores of the quality-representative STPs, one or more quality-improving actions for the video stream.

In some aspects, the first reduced-quality stream has the first temporal resolution and the second reduced-quality stream has the first spatial resolution.

In some aspects of the disclosure, a combined number of pixels in the first reduced-quality stream and the second reduced quality stream is below ten percent of a number of pixels in the video stream.

In some aspects, each STP includes a portion sampled from multiple frames of the first reduced-quality stream or multiple frames of the second reduced-quality stream.

In some aspects, the computer-implemented method for processing the STPs includes using a projection neural network of the MLM to project each STP to a respective token in a token space. The method can further include processing digital representations of the STPs using a first neural network of the MLM to obtain, for each STP, a relevance score. The neural network can include one or more convolutional neuron layers. The method includes identifying the quality-representative STPs having the relevance score at or above a threshold score. The method can further include processing, using a second neural network of the MLM, the quality-representative STPs to identify the quality score for each quality representative STP. The second neural network can include one or more self-attention neuron layers.

In some aspects, the one or more quality-improving actions for the video stream can include one or more of: generating one or more additional frames for the video stream, modifying the first spatial resolution of the video stream, changing a compression format of the video stream, modifying settings for displaying the video stream on a graphical user interface (GUI), or generating a report indicative of the quality of the video stream being below a threshold value.

In some aspects, the computer-implemented method further includes receiving an updated video stream, wherein the updated video stream is obtained using the one or more quality-improving actions applied to the video stream, evaluating, using the MLM, a quality of the updated video stream, and causing, based on the quality of the updated video stream, at least one of: the updated video stream to be displayed to one or more viewers, responsive to the quality of the updated video stream being at or above a threshold value, or one or more additional quality-improving actions to be applied to the updated video stream, responsive to the quality of the updated video stream being below the threshold value. In some aspects of the disclosure, the one or more quality-rove actions includes using the video stream as an input to a generative MLM to generate the updated video stream. In some aspects of the disclosure, the input into the generative MLM can further include the quality scores of the quality-representative STPs.

An aspect of the disclosure provides a system including a memory and a processor communicatively coupled to the memory. The processor performs operations including obtaining a video stream having a first spatial resolution and a first temporal resolution. The video stream is associated with a ground truth quality score. The processor generates, for the video stream, a first reduced-quality stream of a second spatial resolution and a second reduced-quality stream of a second temporal resolution, and applies a machine learning model (MLM) to at least a portion of the first reduced-quality stream and at least a portion of the second reduced-quality stream to predict a quality score for the video stream. The processor modifies, using the predicted quality score and the ground truth quality score, one or more parameters of the MLM. The MLM can be a regression model, a neural network, a supervised model, or an unsupervised model.

In some aspects, the at least a portion of the first reduced-quality stream includes a first set of spatio-temporal patches (STPs) from the first reduced-quality stream and the at least a portion of the second reduced-quality stream includes a second set of STPs from the second reduced-quality stream.

In some aspects, the operations further include determining, for each STP of the first set of STPs and each STP of the second set of STPs, a first quality score.

In some aspects, the operations further include selecting from the first set of STPs and from the second set of STPs, a first subset of STPs, the first subset of STPs including STPs with first quality scores that satisfy a first quality criterion, and determining, for STPs of the first subset of STPs, a second quality score. The second quality score indicates how a respective STP of the first subset of STPs correlates to other STPs of the first subset of STPs.

In some aspects, the operations further include selecting, from the first subset of STPs, one or more STPs that satisfy a second quality criterion, aggregating second quality scores of the one or more STPs, and mapping the aggregated second quality scores of the one or more selected STPs to the predicted quality score for the video stream.

An aspect of the disclosure provides a non-transitory computer readable storage medium including instructions that, when executed by a processing device, cause the processing device to perform operations including generating, for a video stream of a first spatial resolution and a first temporal resolution a first reduced-quality stream of a second spatial resolution, and a second reduced-quality stream of a second temporal resolution, sampling spatio-temporal patches (STPs) including a first subset of STPs sampled from the first reduced-quality stream and a second subset of the plurality of STPs sampled from the second reduced-quality stream. The instructions further include processing, using a machine learning model (MLM), the STPs to identify a quality score for each quality-representative STP representative of a quality of the video stream, and identifying, using the quality scores of the quality-representative STPs, one or more quality-improving actions for the video stream.

In some aspects, the first reduced-quality stream has the first temporal resolution, and the second reduced-quality stream has the first spatial resolution. In some aspects, each STP includes a portion sampled from multiple frames of the first reduced-quality stream or multiple frames of the second reduced-quality stream. In some aspects, processing the STPs includes using a projection neural network of the MLM to project each STP of the plurality of STPs to a respective token in a token space.

An aspect of the disclosure provides a computer program including instructions that, when the program is executed by a computer, cause the computer to carry out a method that includes generating, for a video stream of a first spatial resolution and a first temporal resolution a first reduced-quality stream of a second spatial resolution, and a second reduced-quality stream of a second temporal resolution, sampling spatio-temporal patches (STPs) including a first subset of STPs sampled from the first reduced-quality stream and a second subset of the plurality of STPs sampled from the second reduced-quality stream. The instructions further include processing, using a machine learning model (MLM), the STPs to identify a quality score for each quality-representative STP representative of a quality of the video stream, and identifying, using the quality scores of the quality-representative STPs, one or more quality-improving actions for the video stream.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 2 is a block diagram 200 that illustrates a representation of the perceptual quality of spatio-temporal patches of a video stream processed by the perceptual quality indicator model.

DETAILED DESCRIPTION

Figure 1:
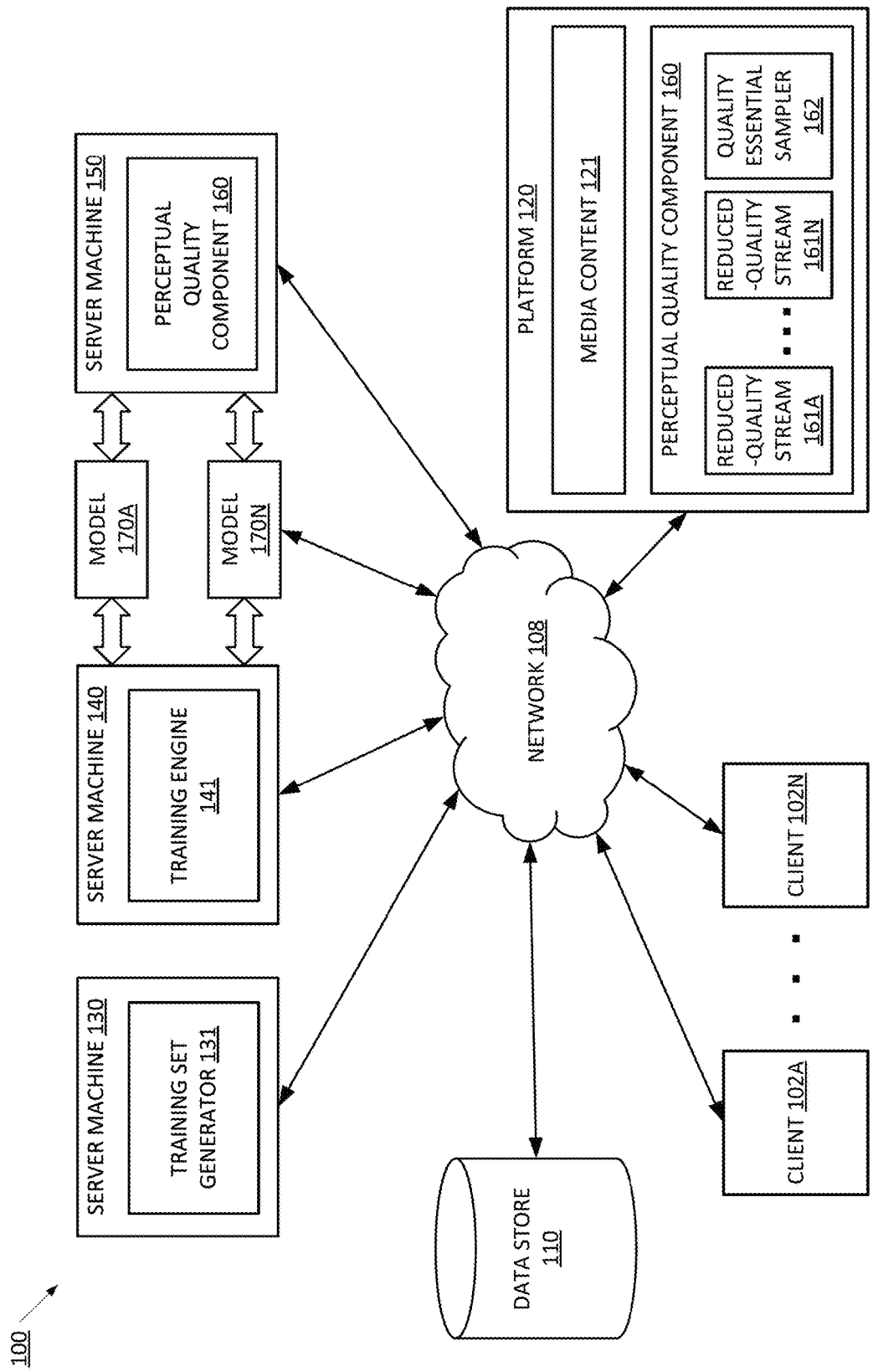
FIG. 1 illustrates an example system architecture, in accordance with implementations of the present disclosure.

Aspects of the present disclosure relate to a highly efficient model for video quality assessment (VQA). A platform, such as a media content platform (e.g., social media, media content sharing platforms, etc.) can present users with media content. The platform can enable the users to consume various media content, including user generated content (UGC). UGC with a higher perceptual quality can improve the experience the user has with the media content and the media content platform. The perceptual quality of media content (e.g., a video stream) can depend on, among other factors, the resolution and framerate of the video stream. For example, video stream with a higher resolution and/or a higher framerate can have a higher perceptual quality. The perceptual quality of video stream can be predicted by VQA methods, which can be a complex process requiring a large amount of computational resources. High resolution frames typically contain more fine-grained details than low resolution frames. Downscaling a high resolution frame to be a more manageable input to a VQA model, those fine-grained details can be lost. Increasing the resolution of video stream can increase the quantity of pixels exponentially (e.g., increase the size of the input to the VQA model). Traditionally, movies have been filmed using the 24 frames-per-second (fps) temporal resolution that results in acceptably smooth motion pictures. Yet today, more and more consumers of video stream (e.g., users of video stream platforms) prefer watching video streams of higher frame rates (e.g., 30 fps and even 60 fps) on video stream platforms. A 1920×1080 stream with the 30 fps frame rate delivers over 100 M pixels each second. As both the resolution and framerates increase, the quantity of pixels in the video stream can increase significantly. Processing such large data sets for quality assessment of the stream is impractical, both in real time and off-line.

To reduce the computational complexity of a VQA model, random sampling and/or predefined patterns of sampling can sometimes be used. However, because useful information to predict the perceptual quality of the video stream can appear in any spatial (across different frame region for a given frame) or temporal (across different frames for a given frame region of the video stream (or both), these sampling techniques can be less effective at predicting the perceptual quality of the video stream when certain parts of the video stream are not sampled (e.g., parts that have a more direct effect on the perceptual quality of the video stream). In some examples of video stream, there can be many quality insensitive or redundant signals that have minimal-to-no impact on the perceptual quality of the video stream. Processing these inputs adds computational complexity without providing any noticeable benefits. Another inefficiency of VQA models can be due to the construction of the VQA model. VQA models can implement machine learning techniques based on a common backbone. Selection of a proper backbone can significantly reduce the computational complexity of the VQA model without a signification reduction in the ability of the model to predict the perceptual quality of the video stream. However, selecting a proper machine learning backbone can be non-trivial and can require "handcrafting" the model to the input dataset, which may cause the VQA model to only be pertinent to a specific dataset or type of dataset.

Perceptual quality of a video can be impacted by how various regions of frames are displayed in the context of other regions within the same frames (spatial perception) as well as by evolution of the regions across a temporal sequence of frames (temporal perception). Depending on a specific stream or a given part of a stream, various regions and/or sequences of regions may affect perceptual quality differently. For example, fast temporal evolution of a region of a video that captures most attention of a viewer may be more determinative of the perceived video quality than slow evolution of other regions in the same video. Similarly, spatial perception of two (or more) persons involved in a slow intense interaction may be more determinative of the perceived video quality than the persons' frame-to-frame evolution or various lower-quality depictions of the background or other persons. Because quality-determinative regions and time sequences can be located at practically any spatial and temporal locales of a video, various rigid heuristics (e.g., focusing on the central region of a video or on is brighter regions) fail to accurately assess video quality of many video streams.

Aspects and implementations of the present disclosure address the above noted and other challenges of the existing technology by reducing computational complexity of VQA models using a two-stage, multiple dataset sampling technique to evaluate the spatiotemporal quality of video stream. VQA models operating in accordance with the disclosed techniques are capable of accurately capturing and evaluating both the spatial and the temporal aspects of perceptual quality of videos. In some implementations, a video stream (e.g., a 1920×1080 pixel 30 fps stream) can be represented via multiple reduced-quality streams, e.g., a first stream that maintains the original temporal resolution (e.g., 30 fps) but has a reduced spatial resolution (e.g., 256×256), and a second stream that maintains the original spatial resolution (e.g., 1920×1080) but has a reduced temporal resolution (e.g., 1 fps). As a result, the first reduced-quality stream maintains information about temporal aspect of the original video stream whereas the second reduced-quality stream maintains information about its spatial aspect (even though the number of pixels per second in the combined first/second reduced quality streams is less than 10% of the number of pixels in the original stream). Patches can then be sampled from both streams (e.g., with an equal or different number of patches samples from each stream) and represented via digital tokens. A patch should be understood as a portion of a corresponding stream that extends along both spatial dimensions and the temporal dimension of the stream. For example, a 16×16×4 patch captures a 16×16 pixel region across 4 frames (which can be contiguous or spaced). Patches can be sampled randomly or according to a suitable sampling schedule (e.g., non-overlapping patches).

A trained machine learning model (MLM) can process the tokenized patches in multiple stages. During a first stage, patches that have little relevance to the video stream quality are eliminated. In some implementations, a first convolutional neural network (having a combination of one or more convolutional layers and one or more fully-connected layers) can output relevance scores, each score measuring relevance of a particular patch to the video stream quality. Patches with relevance scores below a threshold score can be filtered out while patches with relevance scores at or above the threshold score (the quality-representative patches) can be retained for additional processing. In some implementations, the threshold score can be a predetermined score. In some implementations, the threshold score can be stream-dependent, e.g., such that a fixed number N of patches with highest relevant scores are retained. During a second stage, the quality-representative patches can be processed by a second neural network, which can include one or more self-attention neural layers (e.g., one or more transformer blocks). The second neural network can treat different patches as self-attention key-value pairs and capture a global context of how perception of different patches—through learned self-attention weights for each pair of patches—combines into perception quality of the video stream as a whole. The second neural network can aggregate pairwise self-attention scores into quality scores for individual patches. The quality scores for different patches can then be used to predict a quality score for the whole video stream (e.g., by further aggregating quality scores of different patches).

Based on the quality score for the video stream, one or more quality-improving actions can be identified, recommended and/or implemented, such as generating one or more additional frames for the video stream (e.g., by generating interpolation frames), modifying spatial resolution of the video stream (e.g., by spatial upsampling), changing a compression format of the video stream, modifying settings for displaying the video stream on a graphical user interface, generating reports indicative of the quality of the video stream being insufficient, and/or the like. In some implementations, the actions to improve video quality can include using the low-quality video stream as an input into a generative MLM to generate a higher-quality modified stream. In some implementations, the quality-improving actions can be informed by the quality scores of individual quality-determinative patches and/or locations (spatial and temporal) of those patches. For example, the quality scores/locations of the quality-determinative patches can be used as an additional input into the generative model.

The disclosed MLM can be trained to output relevance based on human-based subjective quality scores for training videos. In some implementations, the MLM can be trained on the global quality scores for the whole videos. In some implementations, the MLM can be trained using tokenized patches in conjunction with human annotations (e.g., local quality scores) corresponding to the tokenized patches.

Numerous additional implementations of the two-stage video quality assessment are disclosed herein. The advantages of the disclosed systems and techniques include (but are not limited to) fast, efficient, and flexible heuristic-free assessment of a quality of diverse range of videos. Because of the flexible nature of patch sampling, filtering, and processing of filtered patches, the disclosed systems and techniques are not limited in the location of quality-relevant patches.

FIG. 1 illustrates an example system architecture 100, in accordance with embodiments of the present disclosure. The system architecture 100 (also referred to as "system" herein) includes client devices 102A-N, a data store 110, a platform 120, and/or server machines 130-150, each connected to a network 108. In some implementations, network 108 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 can be a persistent storage capable of storing data as well as data structures to tag, organize, and index the data. A data item can include video stream data (e.g., video frames, audio etc.), in accordance with embodiments described herein. Data store 110 can be hosted by one or more storage devices, such as main memory, magnetic or optical storage based disks, tapes, or hard drives, and so forth. In some embodiments, data store 110 can be a network-attached file server or some other type of persistent storage such as an object-oriented database, a relational database, and so forth, that may be hosted by platform 120 or one or more different machines coupled to the platform 120 via network 108.

The client devices 102A-N can each include computing devices such as personal computers (PCs), laptops, mobile phones, smart phones, tablet computers, netbook computers, network-connected televisions, etc. In some implementations, client devices 102A-N may also be referred to as "user devices." Each client device 102 can include a video stream viewer. In some embodiments, the video stream viewer can be an application that provides a graphical user interface (GUI) for users to view, edit, and/or create a video stream 121, such as a video file. For example, the content viewer can be a web browser that can access, retrieve, present, and/or navigate video stream 121 served by a web server. The video stream viewer can render, display, and/or present the video stream 121 to a user. In one example, the video stream viewer can be a standalone application (e.g., a mobile application or app) that allows users to view, edit, and/or create video stream 121. In some implementations, the video stream viewer can be a video stream platform application for users to view, generate, edit, and/or upload video stream to platform 120. As such, the video stream viewers can be provided to the client devices 102A-N by platform 120.

In some implementations, platform 120 and/or server machines 130-150 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to a video stream 121 (e.g., a video) and/or provide the video stream 121 to the user. For example, platform 120 can be a video content platform. The video content platform can allow a user to create, edit, access, or share with other users, video content stored at data store 110. Platform 120 can also include a website (e.g., a webpage) or application back-end software that can be used to provide a user with access to the video stream 121. Platform 120 can include video stream 121. Video stream 121 can be made accessible through platform 120. In some embodiments, platform 120 can facilitate the access of video stream 121 by a client device, but not include the video stream 121. For example, a client device 102 can request a particular video stream 121 from platform 120. Platform 120 can identify the video stream 121 (e.g., stored in data store 110) and can determine how to present the client device 102 with the requested video stream 121. In some embodiments, platform 120 can provide the client device 102 with access to the file via the GUI of the video stream viewer, as described above.

Platform 120 can include a perceptual quality component 160 that is configured to generate perceptual quality indicators for the video stream 121 provided by platform 120. Perceptual quality component 160 can predict a perceptual quality of the video stream 121 using one or more models 170A-N that are trained to identify the perceptual quality of the video stream 121. Further details regarding training and using models 170A-N are provided herein.

Server machine 130 can include a training set generator 131 that is capable of generating training data (e.g., a set of training inputs and a set of target outputs) to train models 170A-N. In some embodiments, training data can be associated with training a model 170 to predict perceptual quality of the video stream 121. In some embodiments, training set generator 131 (or another component of system 100) can store the perceptual quality indicators for a respective video stream 121 at data store 110. Training set generator 131 can also generate training data associated with training a model 170 to predict a perceptual quality of the video stream 121. Training set generator 131 can generate a set of training data by identifying data corresponding to previously provided video streams stored at data store 110. Training set generator 131 can generate training data for training the model 170 using quality metrics for previous spatio-temporal patches (STPs) included at data store 110. An STP can refer to a sample of a video stream, such as a single frame, a series of frames, a superimposed series of frames (e.g., where two or more frames are represented in a still image), a division of a frame (e.g., a frame can be spatially divided into two or more division), etc. Training set generator 131 can include a respective previously provided STP in the subset of training inputs. The training set generator 131 can include additional data associated with the STP in the subset of target outputs in supervised training. In some embodiments, training set generator 131 can generate training data for training the model 170 to predict a quality metric for each STP.

In some embodiments, model training is unsupervised. For example, to train an unsupervised model, training set generator 131 can generate training data by clustering groups of previously provided STPs (e.g., included in data store 110) based on similarities between the STPs, through dimensionality reduction by reducing the number of features in the data while retaining as much relevant information about the STPs as possible, by generating synthetic or partially synthetic data that resembles the original data, through anomaly detection by identifying parts of STPs that are significantly different from the rest of the data, or through data augmentation by applying various mathematical transformations to the training dataset.

In some embodiments, model training is supervised, and each set of training data can include a subset of training inputs and target outputs based on the identified data. For example, to train a supervised model, training set generator 131 can generate training data including a subset of training inputs and a subset of target outputs. The subset of training inputs can include a previously provided STP (e.g., included in data store 110, as described above) and the subset of target outputs can include a quality metric associated with the STP.

Server machine 140 can include a training engine 141. Training engine 141 can train a machine learning model 170A-N using the training data from training set generator 131. The machine learning model 170A-N can refer to the model artifact that is created by the training engine 141 using the training data that includes training inputs. The training engine 141 can find patterns in the training data that and provide the model 170 that captures these patterns. The model 170A-N can be composed of one or more layers, e.g., a single level of linear or non-linear operations (e.g., a support vector machine (SVM) or may be a deep network, i.e., a machine learning model that is composed of multiple levels of non-linear operations). An example of a deep network is a neural network with one or more hidden layers, and a neural network can be trained by, for example, adjusting the weights of the neural network in accordance with a backpropagation learning algorithm or the like. For convenience, the remainder of this disclosure will refer to the EUVQ model as a neural network, even though some embodiments might employ an SVM or other type of learning machine instead of, or in addition to, a neural network. In some embodiments, the training set is obtained by training set generator 131 hosted by server machine 130. It should be noted that although embodiments of the present disclosure describe distinct models 170A-N being trained to predict data (e.g., a perceptual quality indicator) associated with different types of video streams 121, training engine 141 can train a model 170 to predict data associated with each type of video stream 121. For example, training engine 141 can use each set of training data generated by training set generator 131 to train a model 170 to predict a perceptual quality of the video stream 121. In some embodiments of a supervised model, the subset of target outputs in the training data set can include an indication of the perceptual quality of the video stream 121.

Server machine 150 can include a perceptual quality component 160 that provides a video stream as input to one or more models 170A-N to obtain one or more outputs. Perceptual quality component 160 can determine the perceptual quality indicator of the video stream 121 based on one or more outputs of the model 170. In response to determining the perceptual quality indicator of the video stream 121, perceptual quality component 160 can generate a mapping between the video stream 121 and the perceptual quality indicator. Perceptual quality component 160 can store the generated mapping in data store 110, a memory associated with a client device 102, and/or another memory associated with system 100. In some embodiments, perceptual quality component 160 can provide a reduced quality video stream (e.g., a sample of the video stream) as input to a model 170 that is trained to predict a perceptual quality indicator of the video stream 121 as described above. In response to determining the perceptual quality indicator of the video stream 121, perceptual quality component 160 can generate a mapping between STPs derived from the video stream 121 and the perceptual quality indicator. In some embodiments, perceptual quality component 160 (or another component of platform 120) can enhance the video stream 121, and/or STP(s) included in the video stream 121. For example, perceptual quality component 160 can generate new or modified STPs to replace original STPs included in the video stream 121.

Perceptual quality component 160 can include dataset(s) 161A-N and quality essential sampler 162. Perceptual quality component 160 can separate the video stream 121 into multiple datasets 161A-N. The dataset(s) 161A-N can be processed by quality essential sampler 162. The quality essential sampler 162 can break dataset(s) 161 into sub-parts (e.g., STPs) and determine which sub-parts impact the perceptual quality of the video stream 121. The quality essential sampler 162 can determine a perceptual quality indication for each sub-part of the video stream 121. In some embodiments, the perceptual quality indication can be determined only for subparts of the video stream 121 that satisfy certain preliminary quality indicator thresholds. For example, the quality essential sampler 162 can determine certain subparts of the video stream 121 dominate the perceptual quality of the video stream 121 because the interrelatedness of the certain subparts with the rest of the subparts of the video stream 121 is higher than a certain threshold. In this example, the quality essential sampler 162 would determine the perceptual quality indication for the certain subparts of the video stream 121, but not the rest of the subparts of the video stream 121. The quality essential sampler 162 can forgo calculating perceptual quality indicators for subparts of the video stream 121 that do not have a dominating effect on the perceptual quality of the video stream 121. By determining which subparts of the video stream 121 are perceptual quality related, or perceptual quality dominating, quality essential sampler 162 can reduce the computational power needed to determine the perceptual quality of the video stream 121.

It should be noted that in some embodiments, the functions of server machines 130, 140, and 150 or platform 120 may be provided by a fewer number of machines. For example, in some implementations the server machines 130 and 140 may be integrated into a single machine, while in other implementations the server machines 130, 140, and 150 may be integrated into multiple machines. In addition, in some implementations one or more of server machines 130, 140, and 150 may be integrated into platform 120. In general, functions described in implementations as being performed by platform 120 and/or server machines 130-150 can also be performed on the client devices 102A-N in other implementations, if appropriate. In addition, the functionality attributed to a particular component can be performed by different or multiple components operating together. Platform 120 can also be accessed as a service provided to other systems or devices through appropriate application programming interfaces, and thus is not limited to use in websites.

In some embodiments of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline, such as a topic channel, of platform 120. Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over what information is collected about the user, how that information is used, and what information is provided to the user.

FIG. 2 is a block diagram 200 that illustrates a representation of the perceptual quality of spatio-temporal patches (STPs) of a video stream processed by a perceptual quality indicator model, in accordance with embodiments of the present disclosure. The EUVQ model can improve the efficiency of VQA with multiple dataset sampling strategy. Generally, for a fixed resolution, more temporal samplings can achieve a better model performance (e.g., the EUVQ model can process faster). Generally, with a fixed number of temporal slices, the higher the resolution, the better the accuracy (e.g., the EUVQ model can produce more accurate perceptual quality indicators). In the illustrative example, the multiple dataset sampling strategy is depicted as a dual dataset sampling strategy, with one dataset (e.g., a reduced-quality stream) prioritizing video stream resolution, and the other dataset prioritizing video stream framerate. The reduced-quality stream prioritizing video stream resolution can use the original resolution of the video stream. The reduced-quality stream prioritizing video stream framerate can use the original framerate of the video stream. In some embodiments, the reduced-quality stream prioritizing a certain aspect of the video stream (e.g., resolution, framerate, color-space mapping, etc.) can be modified from the original aspect of the video stream. In such embodiments, secondary aspect of the video stream included in each reduced-quality stream can contain less information than prioritized aspects of certain reduced-quality streams.

For example, sample 201 can include three frames of a video stream. As used herein, "frame" refers to a still image of the video stream at a certain timestamp (e.g., temporal location of the video stream). Thus, sample 201 can represent three temporal locations of the video stream. Each frame can be divided into a quantity of spatio-temporal patches (STPs) 202. Frames can be divided into STPs in a grid-like fashion, as illustratively shown in STP quality overlay 210. It should be noted that the 7×12 grid of 84 STPs of STP quality overlay 210 is for illustrative purposes only, and other grid configurations and quantities of STPs 202 are possible.

STPs 202 are individual portions of the video stream. STPs 202 can be derived from the video stream by, for example, spatial division and/or temporal slicing. An example of spatial division can be seen in the illustrative grid-pattern of STP quality overlay 210. Spatial division divides up the video stream into a reduced quality stream that maintains the full resolution of the original video stream, but at a reduced framerate. An example of temporal slicing can be seen in sample 201. Temporal slicing slices the video stream into a reduced quality stream that maintains the full framerate of the original video stream, but at a reduced resolution. A reduced quality stream can include a spatial division and a temporal slice of the video stream. The reduced quality stream can include original aspects of either the spatial division or the temporal slice of the video stream. This process of dividing the video stream into two reduced quality streams with respective STPs 202 can be referred to "downscaling" the video stream. Here, "downscaling" can refer to a reduction in an underlying feature of the reduced quality stream (or similarly of the video stream). Downscaled reduced quality streams retain most of the information from the original video stream, but are a sampled version of the original video stream, and thus retain less specific information, while occupying less data space.

Processing logic can identify quality related STPs 204 from STPs 202. In some embodiments, a model, or layer of a model (e.g., model 170 as described in FIG. 1) can be used to identify quality related STPs 204 from STPs 202. Quality related STPs 204 can include quality dominating STPs 206. Processing logical can identify quality dominating STPs 206 based on the correlation each quality related STP 204 has with the other quality related STPs 204. A quality dominating STP 206 is a quality related STP 204 that has more correlations to other quality related STPs 204 the rest of quality related STPs 204. The quantity of quality dominating STPs 206 identified by processing logic can be configurable. In some embodiments, the quantity of quality dominating STPs 206 identified by processing logic is based on the correlation values of each quality related STP 204 satisfying some threshold condition. For example, a threshold condition can be that all quality related STPs 204 that have a certain correlation value to "N" number of (e.g., ten) other quality related STPs 204 are considered quality dominating STPs 206. In this example, there is no explicit upper or lower limit on the number of quality dominating STPs 206 that processing logic can identify, instead the number of quality dominating STPs 206 is controlled by qualifying criteria (e.g., the threshold condition(s)). The correlation score between the quality related STPs 204 used to identify quality dominating STPs 206 can be calculated in various ways, including with a mapping data structure, a machine learning model, an algorithm, etc., and is further described in FIGS. 3A-3B.

Quality related STPs 204 include STPs 202 that have been identified as being related to the perceptual quality of the video. As shown in this illustrative example, some of the quality related STPs 204 identified include portions of the wings of the larger bird, and the head and torso of the smaller bird. These quality related STPs 204 have been selected by processing logic because the underlying video stream aspects that they represent (e.g., a resolution, a framerate, etc.) was considered useful (e.g., related) to predicting the perceptual quality of the video stream. Processing logic has identified that the value of the perceptual quality indicator for the video stream as a whole (e.g., the video clip of the two birds) is related to these identified quality related STPs 204. Quality related STPs 204 can be selected from spatially subdivided STPs 202 (e.g., STPs with an original resolution aspect and a modified framerate aspect) or from temporally sub-sliced STPs 202 (e.g., STPs with an original framerate aspect and a modified resolution aspect). It is possible, in some embodiments, that only spatially subdivided STPs 202 or only temporally sub-sliced STPs 202 are selected as quality related STPs 204. The process for determining which of STPs 202 are quality related STPs 204 is further described below in FIGS. 3A-3B.

Quality dominating STPs 206 include quality related STPs 204 that have been identified as dominating the perceptual quality of the video. As shown in this illustrative example, some of the quality dominating STPs 206 identified include portions of the torso, tail, and feet of the larger bird. Quality dominating STPs 206 are selected based on the correlation that each quality related STP 204 has with other quality related STPs 204. In some embodiments, quality dominating STPs 206 can be selected as an indicator for a cluster of neighboring quality related STPs 204. The process for determining which of quality related STPs 204 are quality dominating STPs 206 is further described below in FIGS. 3A-3B.

STP quality overlay 210 is a visual representation of the respective categorization of patches of sample 201. For example, STP quality overlay 210 illustratively shows the smaller bird's head to be a quality related STP 204 (the medium gray color). STP quality overlay 210 illustratively shows the larger bird's portion of torso, tail, and foot to be quality dominating STPs 206 (the dark gray color). It should be noted that STP quality overlay 210 is not necessarily a product of the EUVQ model or related algorithm, but is used illustratively here in part to explain the determination of quality related STPs 204 and quality dominating STPs 206. In some embodiments, the EUVQ model or related processing logic can generate visual representations of video stream similar to STP quality overlay 210 as an output.

Figure 3A:
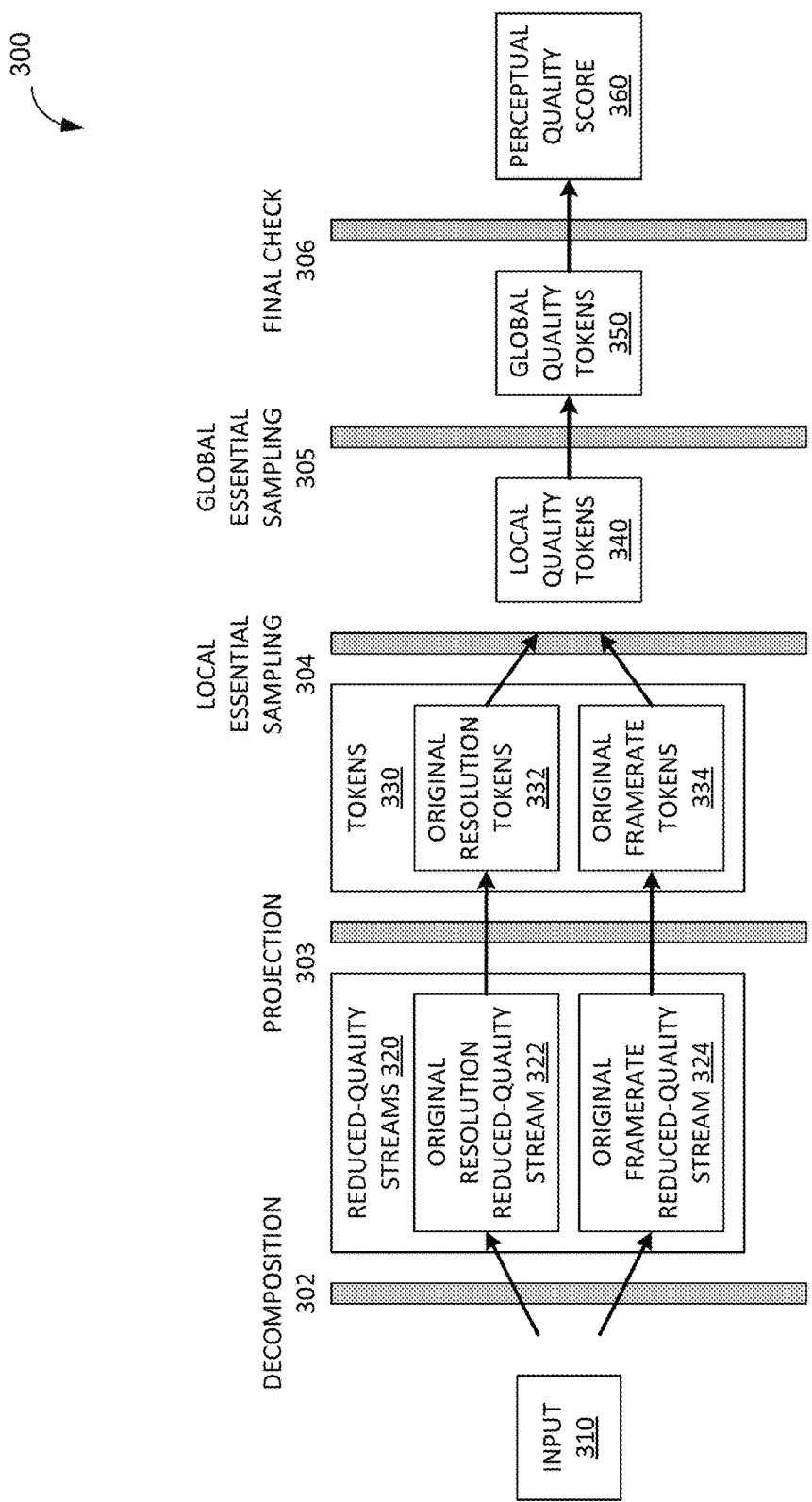
FIG. 3A is a block diagram illustrating an example transformation flow of input to an EUQV model from the input to the EUQV model to the output of EUQV model as the perceptual quality score 360, in accordance with embodiments of the present disclosure.

FIG. 3A is a block diagram 300 illustrating an example transformation flow of input to an EUQV model from input 310 to the output of EUQV model as the perceptual quality score 360, in accordance with embodiments of the present disclosure. Input 310 (e.g., video stream) passes through several phases or layers of the EUQV model, here shown as decomposition 302, projection 303, local essential sampling 304, global essential sampling 305, and final check 306. Each layer of the EUQV model applies one or more linear or non-linear mathematical transformations to the data received at the respective layer. The operations of each of these layers, (decomposition 302, projection 303, local essential sampling 304, global essential sampling 305, and final check 306) are further described in FIG. 3B.

Input 310 can be video stream, (e.g., video stream 121 described in FIG. 1). In some embodiments, input 310 can include reduced quality streams derived from video stream. Input 310 is decomposed into multiple reduced quality streams 320 by decomposition 302. In the illustrative example, reduced quality streams 320 includes original resolution reduced quality stream 322 and original framerate reduced quality stream 324. In some embodiments, reduced quality streams 320 can include other types reduced quality streams that prioritize different aspects of the given video stream (e.g., color-space mapping). Each of reduced quality streams 320 is converted to respective tokens 330 in a projection layer by projection 303.

In the illustrative example, tokens 330 includes original resolution tokens 332, and original framerate tokens 334. In some embodiments, tokens 330 can include other tokens derived from reduced quality streams that prioritized different aspects of the given video stream. After tokens 330 are created, the EUQV model does not distinguish tokens prioritizing one aspect of the video stream over tokens prioritizing another aspect of the video stream. In the illustrative example, the EUQV model does not distinguish original resolution tokens 332 from original framerate tokens 334. E.g., during the following sampling steps, the EUQV model selects from tokens 330 that meet the sampling requirements, regardless of whether the token 330 was derived from the original resolution reduced quality stream 322 or the original framerate reduced quality stream 324. In some embodiments, the EUQV model can be configured to prioritize one token type over another. For example, the EUQV model might be configured to prioritize tokens derived from the reduced quality stream prioritizing video stream resolution (i.e., original resolution reduced quality stream) over tokens derived from the reduced quality stream prioritizing video stream framerates (i.e., original framerate reduced quality stream). In some embodiments, tokens 330 can be projected STPs of a reduced quality stream (e.g., STPs 202 described in FIG. 2).

Local quality tokens 340 include tokens 330 which the EUQV model identified as meeting some quality criterion of local essential sampling 304. In some embodiments, the local quality score can be determined for each of tokens 330, and local quality tokens 340 can include tokens 330 with a local quality score above a certain threshold (e.g., the quality criterion of local essential sampling 304). The quality criterion of local essential sampling 304 is further described below.

Global quality tokens 350 include local quality tokens 340 which were identified as meeting some quality criterion of global essential sampling 305. In some embodiments, the global quality score can be determined for each of local quality tokens 340, and global quality tokens 350 can include local quality tokens 340 with a global quality score above a certain threshold (e.g., the quality criterion of global essential sampling 305). The quality criterion of global essential sampling 305 is further described below.

Perceptual quality score 360 is an indication of the perceptual quality of a video stream based on the global quality tokens 350. Perceptual quality score 360 can include one or more indications, and can be the product of one or more algorithms or mathematic transformations performed during final check 306. In some embodiments, the perceptual quality score 360 can be the value(s) of global quality essential scores of the global quality tokens 350.

In a particular embodiment, the EUQV model generates, from a video stream input, two reduced quality streams, 1) a cropped original resolution frame sequence of 224×224, and 2) a down-scaled high framerate sequence with default resolution of 256×256, which is randomly cropped to 224×224. Alternatively, the 256×256 resolution can be centrally cropped to 224×224. Frames of the video stream can be sampled with strides ranging from 1 to 3 randomly. For original-framerate sequences, three frames are uniformly sampled, and cropped to a resolution of 224×224. Due to current hardware and/or software limitations that can limit the quantity of inputs to the EUVQ model, cropped original framerate slices can be randomly resampled to discard several frames, thus reducing the size of the input. The STP extraction size can be a resolution and a quantity of frames, such as 16×16×4 (e.g., 16 pixels by 16 pixels and 4 frames). When the number of frames decreases for the STP (e.g., 16×16×2, etc.), the model can extract more tokens, and produce more accurate outputs. When the number of frames increases for the STP (e.g., 16×16×8, etc.) the model can extract less tokens, and perform the perceptual quality indicator predictions faster. In some embodiments, the EUQV model can use a mean square error (MSE) training loss function.

Figure 3B:
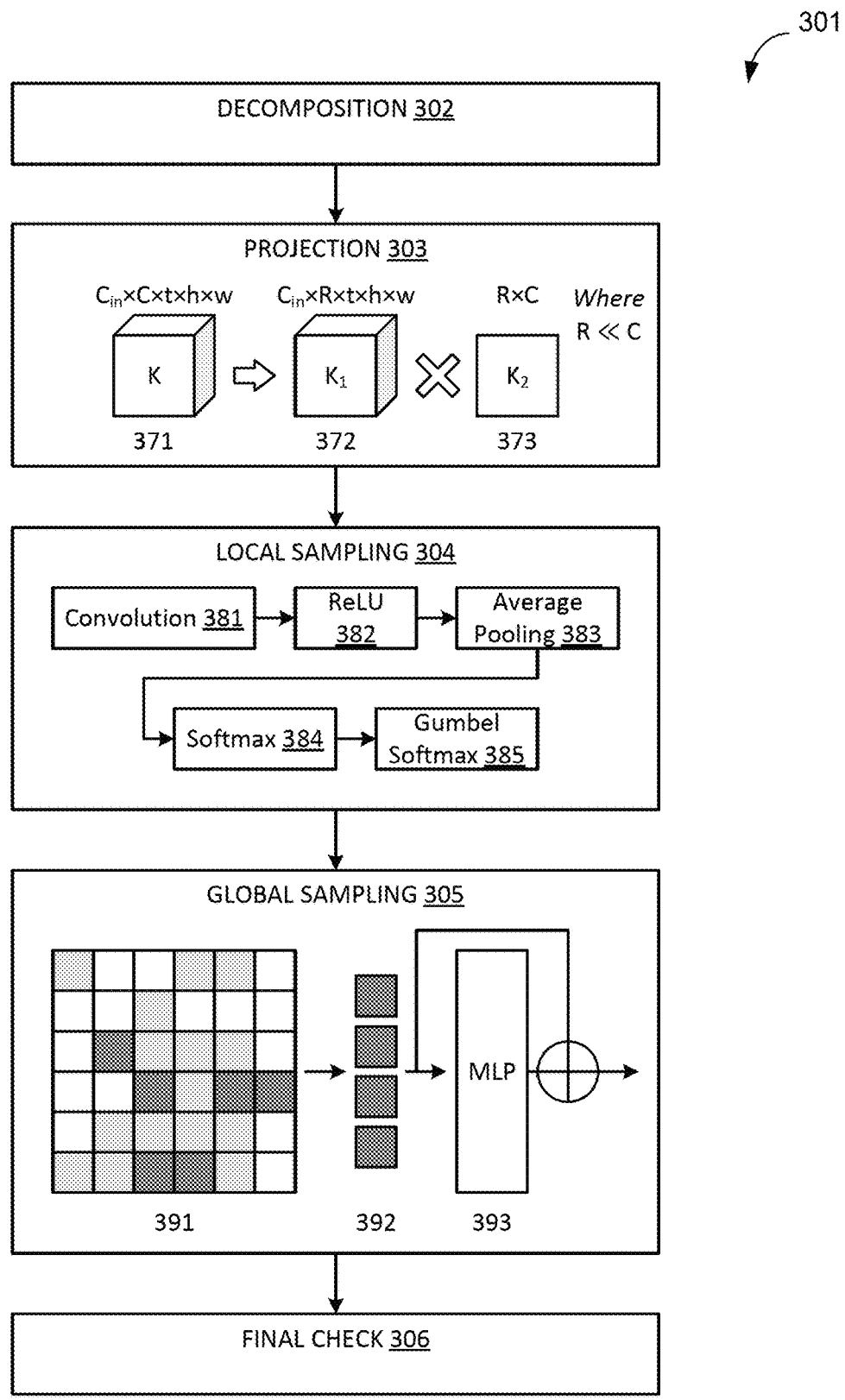
FIG. 3B is a block diagram illustrating the operations performed at each phase or layer of the EUQV model to transform the input (e.g., the video stream) into a perceptual quality score for the video stream, in accordance with embodiments of the present disclosure.

FIG. 3B is a block diagram 301 illustrating the operations performed at each phase or layer of the EUQV model to transform input 310 (e.g., the video stream) into a perceptual quality score 360 for the video stream, in accordance with embodiments of the present disclosure.

During decomposition 302, the input 310 to the model is separated into multiple reduced quality streams 320. Reduced quality streams 320 can retain an original aspect of the video stream, while modifying other aspect(s) of the video stream to reduce the size of the input. For example, given a 1920×1080 resolution, 30 frames-per-second (fps) video, one reduced quality stream can include a 1920×1080 resolution, 1 fps reduced quality stream, and one reduced quality stream can include a down-scaled 256×256 resolution, 30 fps reduced quality stream. In this example, the total number of pixels to be processed by the EUQV model before and after decomposition 302 have a ratio of 1:0.065. This and similar reductions to the number of pixels that need to be processed by the EUQV model can significantly reduce the computational complexity of the model with minimal loss to accuracy. After the video stream is decomposed into multiple reduced quality streams 320, the reduced quality streams 320 can be transformed into tokens.

During projection 303, each reduced quality stream 320 is transformed into tokens 330 by projection 303. Projection 303 can be a projection layer of a machine learning model. Projection 303 can be a simple projection that takes the reduced quality streams 320 as an input (e.g., input K 371), and transforms the reduced quality streams 320 with a linear transformation into a new vector space. In the illustrative example, input K 371 ($C_{in}$×C×t×h×w) can be represented as $K_1$ 372 ($C_{in}$×R×t×h×w) cross $K_2$ 373 (R×C), where R<<C. $K_2$ 373 can represent a "flattened" input K 371, and can be processed by the EUQV model as a token 330. In some embodiments, $K_1$ 372 can be used to represent input K 371 and processed by the EUQV model as a token 330. After projection 303, each token 330 can represent a local STP of the video stream (e.g., STP 202 described in FIG. 2).

Local essential sampling 304 and global essential sampling 305 can be two parts of a quality essential sampling operation performed by the EUQV model, or a quality essential sampler (e.g., quality essential sampler 162 described in FIG. 1). A token 330 can be "quality essential" if the token 330 is useful in predicting perceptual quality of the video stream. Local essential sampling 304 can refer to the process for selecting quality related STPs 204 described above in FIG. 2. Global essential sampling 305 can refer to the process for selecting quality dominating STPs 206 described above in FIG. 2.

During local essential sampling 304, the EUQV model estimates the usefulness of a given token 330 for predicting perceptual quality of the video stream with respect to a small, localized neighborhood of tokens 330. Local essential sampling 304 evaluates local quality essential scores for all tokens 330, and filters out tokens 330 that are quality non-essential. The tokens 330 with the lowest local quality essential scores can be discarded. In some embodiments, the tokens 330 with a local quality essential score below a threshold value can be discarded. In some embodiments, a top-k selector can be used to discard tokens 330 with the lowest local quality essential scores. Local essential sampling 304 can use a learnable local sampler (e.g., convolution 381 and ReLU 382) to estimate the local quality essential score for each token 330 with minimal computational costs. The computational complexity of performing global essential sampling 305 on each token 330 can be exponentially greater than the computational complexity of performing local essential sampling 304, and thus reducing the number of tokens 330 that pass through global essential sampling 305 can exponentially reduce the computational cost of the EUQV model. In a particular embodiment, the computational complexity of global essential sampling 305 can be $O(N^2)$, and thus, by using local essential sampling 304, the computational cost for following components can be reduced quadratically.

In the illustrative block diagram 301, the local essential sampler used for local essential sampling 304 can be a convolution 381 followed by a rectified linear unit (ReLU) 382. Convolution 381 and ReLU 382 can each be respective layers in a model (e.g., model 170 described in FIG. 1). Convolution 381 can apply a convolution operation to an input by "sliding" a kernel over the input data and computing a dot product between a filter and the input data at each data location. Performing convolution operations can result in a new set of feature maps that capture different aspects of the input data. In some implementations, filter weights for the convolution operation in a machine learning model can be learned during model training using backpropagation. Backpropagation can allow the model (e.g., a neural network) to learn useful representations of the input data for a given task (e.g., predicting a perceptual quality indicator for video stream or a reduced quality stream). During convolution in local essential sampling 304, tokens can be reshaped by $Z=[Z_1 \ldots Z_N]$ as $Z' \in \mathbb{R}^{N_h \times N_w \times C}$ ($N_h \cdot N_w = N$). The convolution can then be performed with the kernel $S \in \mathbb{R}^{C \times C' \times k \times k}$. ReLU 382 can apply an ReLU function to an input (e.g., the output from convolution 381). The ReLU function can have the general form of f(X)=max (0,X). If the input value "X," is greater than or equal to 0, the output value of the ReLU function is the same as the input value (e.g., "X"). If the input value, "X," is less than 0, the output value of the ReLU function is 0. The convolution can be 1:1 to preserve the original spatial layout. Thus, the local essential sampling features can be computed by:

$$Z_{local} = ReLU(Conv2d(Z', S)) \in \mathbb{R}^{N_h \times N_w \times C'}, \qquad (1)$$

where C' is the channel of the output local feature. To aggregate the information of each dimension of $Z_{local}$, local essential sampling 304 can apply average pooling 383. An average pooling function can be used to reduce the spatial dimensions of an input (e.g., the output of ReLU 382). To perform the average pooling function, the average value of subsets of the input are computed for the each portion of the input, which reduces the dimensions of the input and increases uniformity of the input. The average pooling function can reduce the impact of noise and local variations of an input (e.g., the output of ReLU 382). As applied in the illustrative example of local essential sampling 304, average pooling 383 can reduce the channels C' and reshape the first dimension of the convoluted token back to N:

$$z_{agg} = AvgPooling(Z_{local}) \in \mathbb{R}^N. \qquad (2)$$

The aggregated informative vector $z_{agg}$ can indicate the local quality essential scores for tokens 330. Local essential sampling 304 can perform Softmax 384 to obtain the local sampling categorical distribution. Softmax 384 can apply a Softmax function, which normalizes a vector of arbitrary inputs into a probability distribution that sums to 1. The Softmax function can take the general form of $$\text{softmax}(\vec{x})_i = e^{x_i} \frac{e^{x_i}}{\sum_{j=1}^{K} e^{x_j}},$$

where $\vec{x}$ is the input as a vector, $x_i$ is the i-th element of the input vector $\vec{x}$, and $\sum_{j=1}^{K} e^{x_j}$ is the sum of the exponential values of all elements in the input vector $\vec{x}$. As applied in the illustrative example of local essential sampling 304, Softmax 384 can obtain the local sampling categorical distribution with:

$$\pi_{local} = \text{Softmax}(z_{agg}). \qquad (3)$$

In the illustrative example, the most relevant tokens obtained from Softmax 384 can be sampled under a specified rate with Gumbel-Softmax 385. Gumbel-Softmax 385 can optimize the parameters of local essential sampling 304 through backpropagation process and end-to-end training. The Gumbel-Softmax function is a variation of the Softmax function, and can be used in model reinforcement learning, generative modeling, and other machine learning applications. In some implementations, a Gumbel-Softmax function can introduce stochasticity into a model, which can improve the diversity of a model's output. As applied in the illustrative example of local essential sampling 304, Gumbel-Softmax 385 can sample local quality token 340 from the $\pi_{local}$ distribution by:

$$d_{valid} = GumbelSoftmax(\pi_{local}). \tag{4}$$

In the illustrative example of local essential sampling 304, $d_{valid}$ can represent the final decision vector which indicates the corresponding valid local quality tokens 340.

During global essential sampling 305, the EUQV model estimates the usefulness of a given token for predicting perceptual quality of the video stream with respect to a large group of tokens 330. In some embodiments, the large group of tokens includes all tokens corresponding to input 310 from the video stream. Global essential sampling 305 evaluates global scores for all local quality tokens 340, and filters out local quality tokens 340 that are quality non-essential. The global quality essential score of a token can be used for the final perceptual quality prediction of the video stream. To remove local quality tokens 340 that are quality non-essential, global essential sampling 305 globally investigates all local quality tokens 340 as well as the correlations of each local quality token 340 with other local quality tokens 340 using multilayer perceptron (MLP) 393. The MLP 393 can have an input layer, and output layer, and one or many hidden layers. At each layer after the input layer, the MLP 393 can apply a nonlinear activation function to the data. The MLP 393 can be trained through backpropagation and is affected by changing connection weights after each piece of data is processed. Connection weights can be changed based on the amount of error in the output in comparison to an expected result. In some embodiments, a self-attention mechanism can be used to perform the correlation between all local quality tokens. Other global correlation mechanisms are possible.

In the illustrative block diagram 301, global essential sampling 305 applies a self-attention mechanism to a subset of global quality tokens 392 identified from token quality map 391 to compute global quality essential scores. As applied in the illustrative example of global essential sampling 305, the self-attention weights can be computed by:

$$A = Softmax\left(\frac{q(Z) \cdot k(Z)}{\sqrt{d}}\right) \in \mathbb{R}^{N \times N}, \tag{5}$$

where $q(\cdot)$ and $k(\cdot)$ are two learnable mappings of the input tokens, and d is the number of hidden dimensions. The initial input tokens can be local quality tokens 340. Subsequent input tokens can be transformed output tokens from the previous respective layer. In some embodiments, subsequent transformations to the input tokens can be based on global information. The vector A(:,j) in the attention weights A can be considered as the correlations between token j and all other tokens in terms of the quality training objective. As shown in token quality map 391 of global essential sampling 305, global quality tokens 350 (darkest gray squares) can be identified from local quality tokens 340 (medium gray squares). The EUQV model can determine self-attention scores for the global quality tokens 350, and the perceptual quality score 360 can be based on the self-attention scores of the global quality tokens 350.

During final check 306, the EUQV model can perform various verification operations to confirm the global essential score of the token. In some embodiments, final check 306 can perform additional mathematical transformations on the global essential score of a global quality token 350. Global information of each token can be aggregated using a reduced summation. A reduced summation operation can refer to the mathematical operation that sums the elements of a tensor along one or more dimensions to reduce the rank of the tensor. The resulting tensor will have the same shape as the original tensor, except the dimensions which were reduced by the reduced summation operation. As applied in the illustrative example of global essential sampling 305, global information can be aggregated along the first axis of A as:

$$z_{agg} = ReducedSum(A). \tag{6}$$

The $z_{agg}$ can represent the weight for each global token. be considered the global essential score of each token. Global essential sampling 305 can perform a Softmax function on $z_{agg}$ to obtain the global sampling distribution (i.e., normalized $z_{agg}$ values):

$$\pi_{global} = Softmax(z_{agg}). \tag{7}$$

$\pi_{global}$ can represent the normalized $z_{agg}$ value for each global token, such that all $\pi_{global}$ values sum to 1. The tokens with the lowest weights can be removed, and the remaining $\pi_{global}$ values can represent the perceptual quality score 360.

Figure 4:
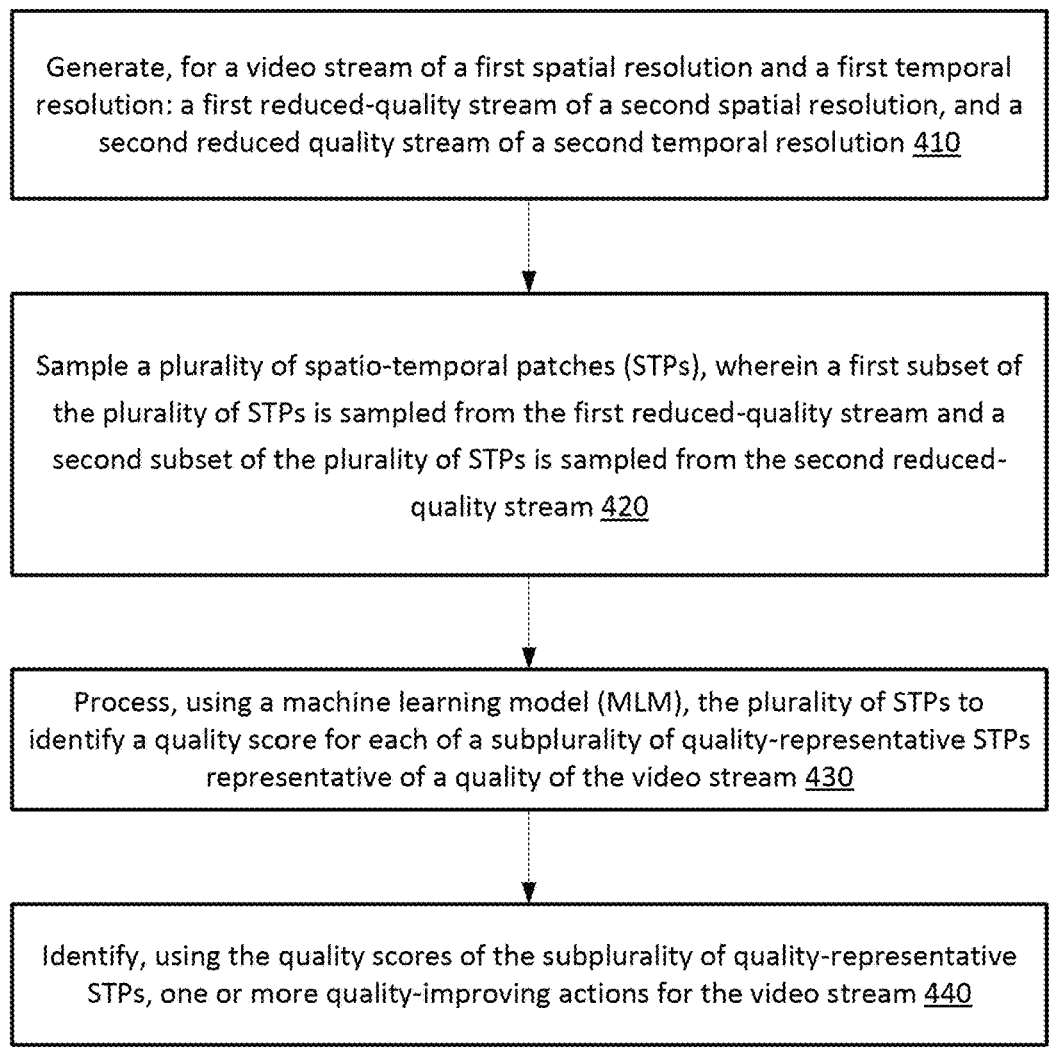
FIG. 4 depicts a flow diagram of an example method for performing video quality predictions with an EUQV model in accordance with embodiments of the present disclosure.

FIG. 4 depicts a flow diagram of an example method for performing video quality predictions with an EUQV model in accordance with embodiments of the present disclosure. Method 400 can be performed by processing logic that can include hardware (circuitry, dedicated logic, etc.), software (e.g., instructions run on a processing device), or a combination thereof. In one implementation, some or all of the operations of method 400 can be performed by one or more components of system 100 of FIG. 1. In some embodiments, some or all of the operations of method 400 can be performed by perceptual quality component 160 as described above.

At operation 410, the processing logic performing the method 400 generates, for a video stream of a first spatial resolution and a first temporal resolution, a first reduced quality stream of a second spatial resolution and a second reduced-quality stream of a second temporal resolution. The first reduced quality stream can retain the first temporal resolution. The second reduced quality stream can retain the first spatial resolution. In some embodiments, the combined number of pixels in the reduced quality streams can be below ten percent of the number of pixels in the video stream.

At operation 420, the processing logic samples a plurality of spatio-temporal patches (STPs), wherein a first subset of the plurality of STPs is sampled from the first reduced-quality stream and a second subset of the plurality of STPs is sampled from the second reduced-quality stream. STPs can include a portion sampled from multiple frames of the first reduced-quality stream or multiple frames of the second reduced-quality stream.

At operation 430, the processing logic processes, using a machine learning model (MLM), the plurality of STPs to identify a quality score for each of a subplurality of quality-representative STPs representative of a quality of the video stream. The MLM can include a projection neural network used to project each STP to a token in a token space. Processing logic can process digital representations of the plurality of STPs using a first neural network of the MLM to obtain for each STP, a relevance score. In some embodiments, the first neural network can include one or more convolutional neuron layers. Processing logic can identify the quality-representatives STPs that have the relevance score at or above a threshold score. Processing logic can process, using a second neural network of the MLM, the quality-representative STPs to identify the quality score for each quality-representative STP. The second neural network can include one or more self-attention neuron layers.

At operation 440, the processing logic identifies, using the quality scores of the subplurality of quality representative STPs, one or more quality-improving actions for the video stream. In some embodiments, the one or more quality-improving actions for the video stream can include: generating one or more additional frames for the video stream, modifying the first spatial resolution of the video stream, changing a compression format of the video stream, modifying settings for displaying the video stream on a graphical user interface (GUI), and/or generating a report indicative of the quality of the video stream being below a threshold value.

In some embodiments, processing logic can receive an updated video stream, wherein the updated video stream is obtained using the one or more quality-improving actions applied to the video stream. Processing logic can evaluate, using the MLM, a quality of the updated video stream. Processing logic can cause, based on the quality of the updated video stream, additional actions to be performed. In some embodiments, the additional actions include displaying the video stream to one or more viewers, responsive to the quality of the updated video stream being at or above a threshold value. In some embodiments, the additional actions include applying one or more additional quality-improving actions to the updated video stream, responsive to the quality of the updated video stream being below the threshold value.

In some embodiments, the one or more quality improving actions can include using the video stream as an input into a generative MLM to generate the updated video stream. The input to the generative MLM can include the quality scores of the quality-representative STPs.

In some embodiments, the one or more quality improving actions can include host actions such as video compression techniques, video enhancement techniques, video streaming optimization settings (e.g., data storage techniques or protocols, data retrieval techniques or protocols, etc.). In some embodiments, the one or more quality improving actions can include client actions such as video stream recommendations for a user of a client device, actions related to searches performed by a user, streaming optimization settings, etc. In some embodiments, the one or more quality improving actions can include reporting actions such as visual representations of outputs from the MLM (e.g., STP quality overlay 210 described with respect to FIG. 2), statistical summaries of outputs from the MLM, graphical representations of outputs from the MLM, new training data generated from the outputs of the MLM, etc. In a particular embodiment, statistical summaries and/or graphical representations of the outputs from the MLM can be provided as feedback to a creator of a given UGC video stream and/or to the platform hosting the respective video stream in a GUI.

In some embodiments, the one or more quality improving actions can include identifying and applying video enhancement techniques, generating additional static visuals, generating additional frames for video stream, and/or generating additional details for a given frame. In some embodiments, enhancement actions can be identified using another machine learning model. In some embodiments, enhancement actions can be identified and/or performed by the same model used to predict the perceptual quality of video stream. The processing logic can identify one or more quality metrics associated with the STP that do not meet a quality metric threshold. The processing logic can create modified video stream by modifying the STPs associated with the one or more quality metrics that do not meet the quality metric threshold. In some embodiments, the processing logic can modify the STPs with a generative machine learning model. The generative model can be provided with an input of the STPs associated with the quality metrics that do not meet the quality metric threshold. Processing logic can replace the respective original STPs with the modified STPs obtained from the output of the generative model. The processing logic can obtain modified outputs of the machine learning model indicating a modified perceptual quality of the modified STP. Responsive to determining the modified perceptual quality of the modified STP exceeds the perceptual quality of the STP, the processing logic can cause actions with respect to the modified video stream to be identified.

Figure 5:
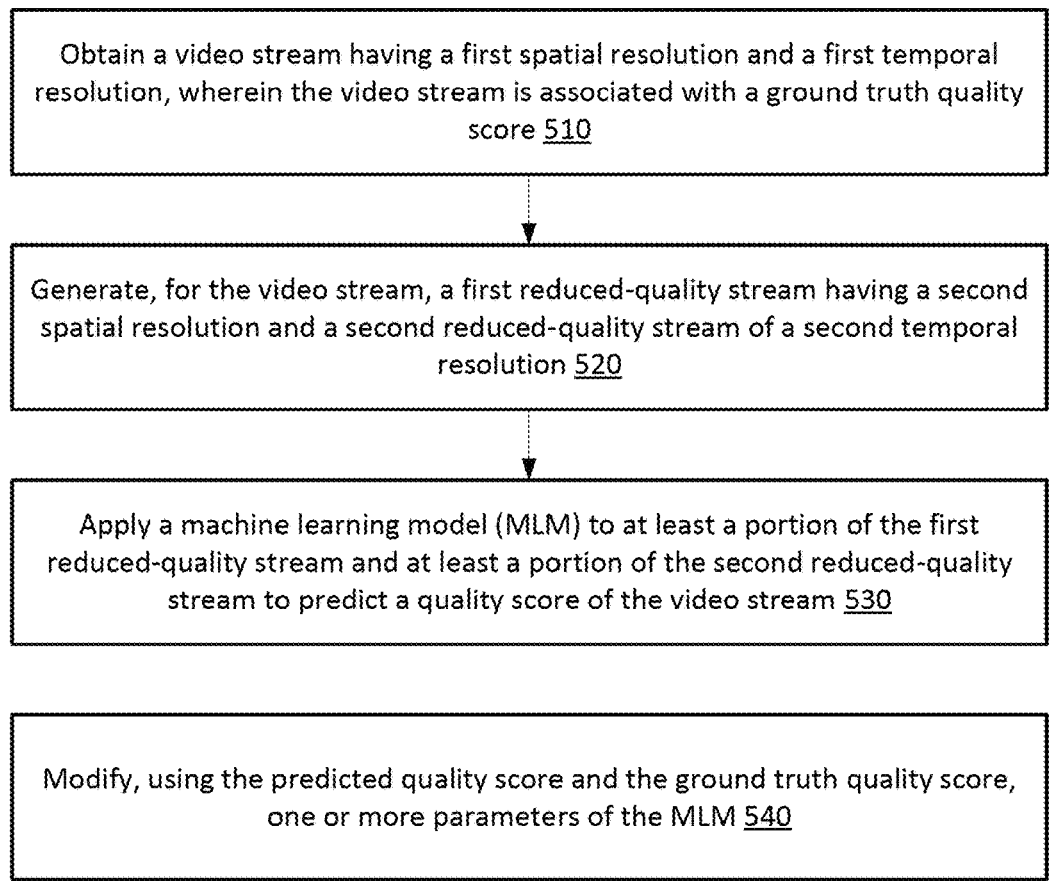
FIG. 5 depicts a flow diagram of an example method for training a model, such as the EUQV model, to make video stream perceptual quality predictions, in accordance with embodiments of the present disclosure.

FIG. 5 depicts a flow diagram of an example method 500 for training a model, such as the EUQV model, to make video stream perceptual quality predictions, in accordance with embodiments of the present disclosure. Method 500 can be performed by processing logic that can include hardware (circuitry, dedicated logic, etc.), software (e.g., instructions run on a processing device), or a combination thereof. In one implementation, some or all of the operations of method 500 can be performed by one or more components of system 100 of FIG. 1. In some embodiments, some or all of the operations of method 500 can be performed by training engine 141 in connection with training set generator 131 as described above. In some embodiments, some or all of the operations of method 500 can be performed by perceptual quality component 160 as described above.

At operation 510, processing logic performing the method 500 obtains a video stream having a first spatial resolution and a first temporal resolution, wherein the video stream is associated with a ground truth quality score and used as a training video stream. The ground truth quality score for the video stream can be derived from aggregated human-based quality ratings. In some embodiments, the video stream and corresponding ground truth quality score can be paired as training data with a specific MLM or MLM backbone.

In some embodiments, the number of available training video streams can be increased using various methods of video augmentation. For example, at least a portion of a given video stream can be modified to change (e.g., improve, reduce, improve in some aspects and reduce in other aspects) the quality of the video stream. More specifically, processing logic can alter one or more STPs of the video stream and recompile the STPs into a viewable video stream. The recompiled viewable video stream can be presented to one or more viewers for a new quality assessment. Alterations to the STPs can include adding noise to the image, filtering the image, sharpening the image, generating additional frames, etc. Quality scores from users of the recompiled viewable video stream can be compared with quality scores of the original video stream to determine whether the alteration improved or worsened the quality of the video stream. The viewers who view the modified (augmented) video stream can be the same viewers or different from viewers who viewed the original video stream (and/or other video streams modified based on the same original video stream).

At operation 520, processing logic generates, for the video stream, a first reduced-quality stream having a second spatial resolution and a second reduced-quality stream of a second temporal resolution. In some embodiments, additional types of reduced quality streams can be generated, e.g., a reduced quality stream that retains a color-space mapping of the video stream, but has a reduced spatial and/or temporal resolution.

At operation 530, processing logic applies a machine learning model (MLM) that is being trained to at least a portion of the first reduced-quality stream and at least a portion of the second reduced-quality stream to predict a quality score of the video stream. The MLM can be at least one of a regression model, a neural network, a supervised model, or an unsupervised model. In some embodiments, the at least a portion of the first reduced-quality stream can include a first set of spatio-temporal patches (STPs) from the first reduced-quality stream. In some embodiments, the at least a portion of the second reduced-quality stream can include a second set of STPs from the second reduced-quality stream. In some embodiments, STPs can be projected into a projection space as tokens. The tokens can be processed through one or more convolution layers. STPs can correspond to an input size for the model. If an STP exceeds the input limitations of the model, the size of the STP can be compressed. In some embodiments, an STP that exceeds the input limitations of the model can be spatially compressed (e.g., the resolution reduced or the frame cropped) or temporally compressed (e.g., frames can be removed and/or combined).

At operation 540, processing logic modifies, using the predicted quality score and the ground truth quality score, one or more parameters of the MLM. In some embodiments, processing logic can determine a first score for each STP (e.g., for each STP of the first set of STPs and for each STP of the second set of STPs). The MLM can determine whether the first quality score of a given STP satisfies a first quality criterion. STPs with first quality scores that satisfy the first quality criterion can be selected as a first subset of STPs. In some embodiments, processing logic can determine a second quality score for each STP based on the first score of the STP. The second quality score can be determined for STPs of the first subset of STPs (e.g., STPs with a first quality score that satisfies the first quality criterion). The second quality score can indicate how a respective STP of the first subset of STPs correlates to the other STPs in the first subset of STPs. Processing logic can determine the predicted quality score for the video stream by aggregating the second score for each STP. In some embodiments, processing logic can select from the first subset of STPs, one or more STPs with a second quality score that satisfies a second quality criterion. Processing logic can aggregate the second quality scores of the one or more STPs and map the aggregated second quality scores to the predicted quality score for the video stream.

In some embodiments, the MLM can include a model backbone that has been pretrained to classify images. The pretrained model backbone can be used in a VQA MLM that is retrained on videos. The initial model backbone can be hand-selected, and pretrained for image recognition. The VQA MLM can retrain the initial model backbone on video streams. The VQA MLM can be retrained on video quality datasets which have corresponding human-derived annotations for the video (e.g., quality scores). In some embodiments, the pretrained model can be based on human-selected weights for STPs or groups of STPs (e.g., human identifications of image quality). In some embodiments, training the VQA MLM can require two inputs: a first input of the video (e.g., reduced quality streams, STPs derived from the video stream) and a second input (ground truth) that includes associated subjective human annotations for the first input. In some embodiments, additional training data can be generated by the VQA MLM or a related model based on correlations between human-identified subjective quality scores. For example, the MLM can be trained on a training dataset of video patches and corresponding video quality scores to generate quality scores for new video content based on similarities between video patches of a similar certain quality score from the training dataset. This generated data can be re-fed into a MLM to further improve the ability of the MLM to make accurate video quality score determinations for new video content. In other embodiments, using image classification, the MLM can be trained to identify STPs of a video stream that are worst-case candidate STPs of the video stream. The MLM can determine that these worst-case candidate STPs correspond to the human-based perceptual quality for the whole video stream. In some embodiments, the MLM can be trained to identify best-case candidate STPs, and can determine the best-case candidate STPs correspond to the human-based perceptual quality for the whole video stream. The MLM can be trained in other ways to identify STPs of the video stream that correspond to the ground truth data of the subjective human-based perceptual quality score for the whole video stream.

Figure 6:
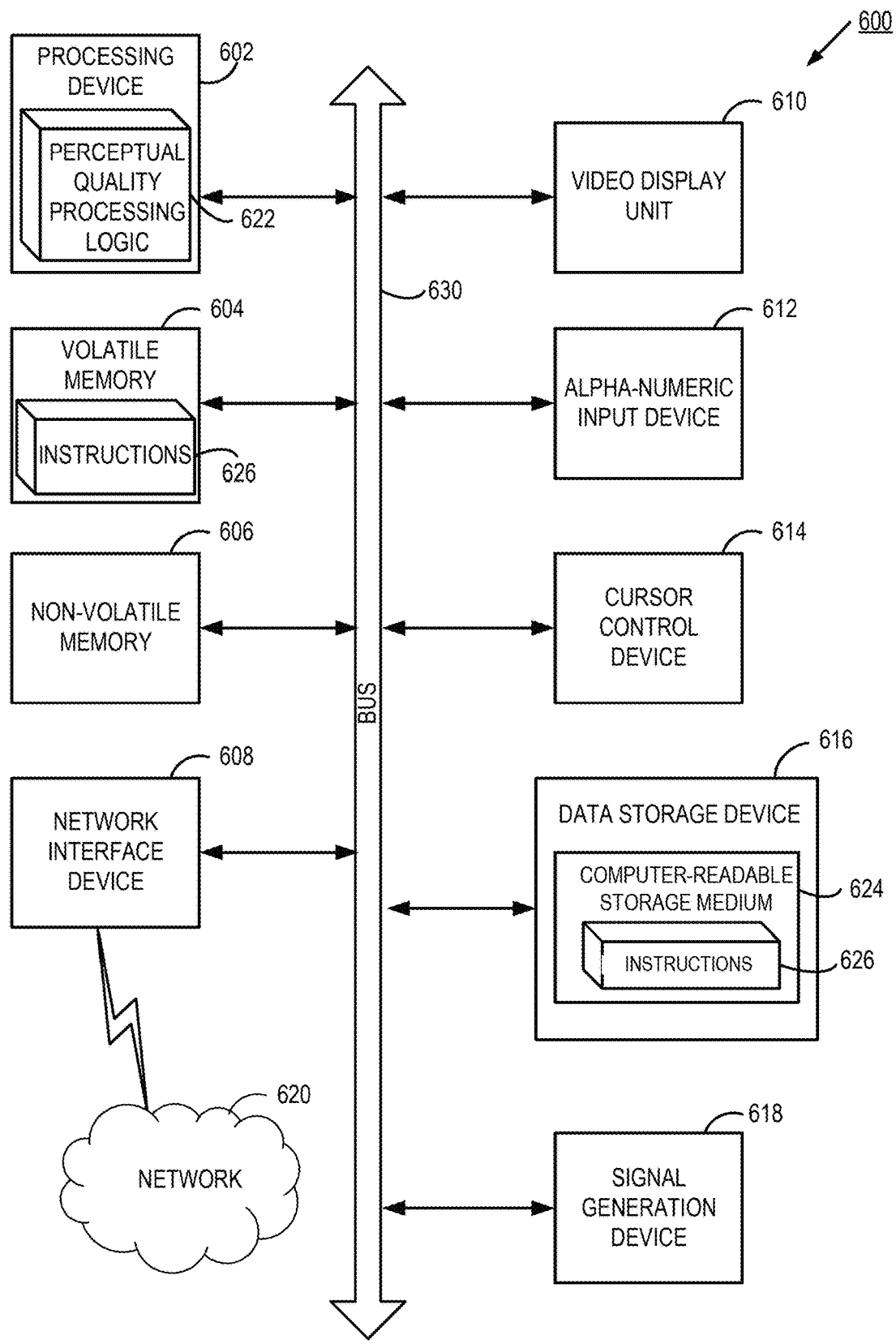
FIG. 6 is a block diagram illustrating an exemplary computer system, in accordance with embodiments of the present disclosure.

FIG. 6 is a block diagram illustrating an example computer system 600, in accordance with embodiments of the present disclosure. The computer system 600 can correspond to platform 120 and/or client devices 102A-N, described in FIG. 1. Computer system 600 can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 600 includes a processing device 602 (e.g., a processor), a main memory 604 (e.g., read-only memory (ROM), flash memory, dynamic random access memory (DRAM) such as synchronous DRAM (SDRAM), double data rate (DDR SDRAM), or DRAM (RDRAM), etc.), a static memory 606 (e.g., flash memory, static random access memory (SRAM), etc.), and a data storage device 616, which communicate with each other via a bus 630.

Processing device 602 represents one or more general-purpose processing devices such as a microprocessor, central processing unit, or the like. More particularly, processing device 602 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 can also be one or more special-purpose processing devices such as an application specific integrated circuit (ASIC), a field programmable gate array (FPGA), a digital signal processor (DSP), network processor, or the like. The processing device 602 is configured to execute perceptual quality processing logic 622 (e.g., for predicting perceptual quality indicators for video stream) for performing the operations discussed herein. The processing device 602 can be configured to execute instructions 626 stored in volatile memory 604.

The computer system 600 can further include a network interface device 608. The computer system 600 also can include a video display unit 610 (e.g., a liquid crystal display (LCD) or a cathode ray tube (CRT)), an input device 612 (e.g., a keyboard, and alphanumeric keyboard, a motion sensing input device, touch screen), a cursor control device 614 (e.g., a mouse), and a signal generation device 618 (e.g., a speaker).

The data storage device 616 can include a computer-readable storage medium 624 (e.g., a non-transitory machine-readable storage medium) 624 on which is stored one or more sets of instructions 626 (e.g., for predicting the perceptual quality of an STP) embodying any one or more of the methodologies or functions described herein. The instructions can also reside, completely or at least partially, within the main memory 604 and/or within the processing device 602 during execution thereof by the computer system 600, the main memory 604 and the processing device 602 also constituting machine-readable storage media. The instructions can further be transmitted or received over a network 620 via the network interface device 608.

While the computer-readable storage medium 624 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," "one embodiment," "an implementation," or "an embodiment," means that a particular feature, structure, or characteristic described in connection with the implementation and/or embodiment is included in at least one implementation and/or embodiment. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:
  generating, for a video stream of a first spatial resolution and a first temporal resolution: a first reduced-quality stream of a second spatial resolution, and
    a second reduced-quality stream of a second temporal resolution;
  sampling a plurality of spatio-temporal patches (STPs), wherein a first subset of the plurality of STPs is sampled from the first reduced-quality stream and a second subset of the plurality of STPs is sampled from the second reduced-quality stream;
  processing, using a machine learning model (MLM), the plurality of STPs to identify a quality score for each of a subplurality of quality-representative STPs representative of a quality of the video stream; and
  identifying, using the quality scores of the subplurality of quality-representative STPs, one or more quality-improving actions for the video stream.

2. The method of claim 1, wherein the first reduced-quality stream has the first temporal resolution, and wherein the second reduced-quality stream has the first spatial resolution.

3. The method of claim 1, wherein a combined number of pixels in the first reduced-quality stream and the second reduced-quality stream is below ten percent of a number of pixels in the video stream.

4. The method of claim 1, wherein each STP of the plurality of STPs comprises a portion sampled from multiple frames of the first reduced-quality stream or multiple frames of the second reduced-quality stream.

5. The method of claim 1, wherein processing the plurality of STPs comprises:
  using a projection neural network of the MLM to project each STP of the plurality of STPs to a respective token in a token space.

6. The method of claim 1, wherein processing the plurality of STPs comprises:
  processing digital representations of the plurality of STPs using a first neural network of the MLM to obtain, for each STP of the plurality of STPs, a relevance score, wherein the first neural network comprises one or more convolutional neuron layers; and
  identifying the subplurality of quality-representative STPs having the relevance score at or above a threshold score.

7. The method of claim 6, further comprising:
  processing, using a second neural network of the MLM, the subplurality of quality representative STPs to identify the quality score for each of the subplurality of quality representative STPs, wherein the second neural network comprises one or more self-attention neuron layers.

8. The method of claim 1, wherein the one or more quality-improving actions for the video stream comprise one or more of:
  generating one or more additional frames for the video stream; modifying the first spatial resolution of the video stream; changing a compression format of the video stream;
  modifying settings for displaying the video stream on a graphical user interface (GUI); or generating a report indicative of the quality of the video stream being below a threshold value.

9. The method of claim 1, further comprising:
  receiving an updated video stream, wherein the updated video stream is obtained using the one or more quality-improving actions applied to the video stream;
  evaluating, using the MLM, a quality of the updated video stream; and causing, based on the quality of the updated video stream, at least one of:
    the updated video stream to be displayed to one or more viewers, responsive to the quality of the updated video stream being at or above a threshold value; or
    one or more additional quality-improving actions to be applied to the updated video stream, responsive to the quality of the updated video stream being below the threshold value.

10. The method of claim 9, wherein the one or more quality-improving actions comprise: using the video stream as an input into a generative MLM to generate the updated video stream.

11. The method of claim 10, wherein the input into the generative MLM further comprises the quality scores of the subplurality of quality-representative STPs.

12. A non-transitory computer readable storage medium comprising instructions that, when executed by a processing device, cause a processing device to perform operations comprising:
  generating, for a video stream of a first spatial resolution and a first temporal resolution: a first reduced-quality stream of a second spatial resolution, and
    a second reduced-quality stream of a second temporal resolution;
  sampling a plurality of spatio-temporal patches (STPs), wherein a first subset of the plurality of STPs is sampled from the first reduced-quality stream and a second subset of the plurality of STPs is sampled from the second reduced-quality stream;
  processing, using a machine learning model (MLM), the plurality of STPs to identify a quality score for each of a subplurality of quality-representative STPs representative of a quality of the video stream; and
  identifying, using the quality scores of the subplurality of quality-representative STPs, one or more quality-improving actions for the video stream.

13. The non-transitory computer readable storage medium of claim 12, wherein the first reduced-quality stream has the first temporal resolution, and wherein the second reduced-quality stream has the first spatial resolution.

14. The non-transitory computer readable storage medium of claim 12, wherein each STP of the plurality of STPs comprises a portion sampled from multiple frames of the first reduced quality stream or multiple frames of the second reduced-quality stream.

15. A system comprising: a memory; and
  a processor communicatively coupled to the memory, the processor to perform operations comprising:
  generating, for a video stream of a first spatial resolution and a first temporal resolution: a first reduced-quality stream of a second spatial resolution, and
    a second reduced-quality stream of a second temporal resolution;

sampling a plurality of spatio-temporal patches (STPs), wherein a first subset of the plurality of STPs is sampled from the first reduced-quality stream and a second subset of the plurality of STPs is sampled from the second reduced-quality stream;

processing, using a machine learning model (MLM), the plurality of STPs to identify a quality score for each of a subplurality of quality-representative STPs representative of a quality of the video stream; and identifying, using the quality scores of the subplurality of quality-representative STPs, one or more quality-improving actions for the video stream.

16. The system of claim 15, wherein the first reduced-quality stream has the first temporal resolution, and wherein the second reduced-quality stream has the first spatial resolution.

17. The system of claim 15, wherein a combined number of pixels in the first reduced-quality stream and the second reduced-quality stream is below ten percent of a number of pixels in the video stream.

18. The system of claim 15, wherein each STP of the plurality of STPs comprises a portion sampled from multiple frames of the first reduced-quality stream or multiple frames of the second reduced-quality stream.

19. The system of claim 15, wherein processing the plurality of STPs comprises:
using a projection neural network of the MLM to project each STP of the plurality of STPs to a respective token in a token space.

20. The system of claim 15, wherein processing the plurality of STPs comprises:
processing digital representations of the plurality of STPs using a first neural network of the MLM to obtain, for each STP of the plurality of STPs, a relevance score, wherein the first neural network comprises one or more convolutional neuron layers; and
identifying the subplurality of quality-representative STPs having the relevance score at or above a threshold score.

* * * * *